United States Patent
Wuergler et al.

(10) Patent No.: US 8,787,977 B2
(45) Date of Patent: Jul. 22, 2014

(54) METHOD OF CONTROLLING DIALING MODES IN A VEHICLE

(75) Inventors: Michael A. Wuergler, Rochester Hills, MI (US); Sherri J. Voran-Nowak, Plymouth, MI (US); Rathinavelu Chengalvarayan, Naperville, IL (US); Gaurav Talwar, Farmington Hills, MI (US)

(73) Assignee: General Motors LLC, Detroit, MI (US)

( * ) Notice: Subject to any disclaimer, the term of this patent is extended or adjusted under 35 U.S.C. 154(b) by 685 days.

(21) Appl. No.: 12/756,767

(22) Filed: Apr. 8, 2010

(65) Prior Publication Data

US 2011/0250933 A1 Oct. 13, 2011

(51) Int. Cl.
*H04B 1/38* (2006.01)
(52) U.S. Cl.
USPC .......... 455/563; 455/418; 455/419; 455/564; 455/569.1; 455/569.2; 379/88.03; 704/270; 704/270.1
(58) Field of Classification Search
USPC .......... 455/418, 419, 563, 564, 569.1, 569.2; 379/88.03; 704/270, 270.1
See application file for complete search history.

(56) References Cited

U.S. PATENT DOCUMENTS

| | | | | |
|---|---|---|---|---|
| 4,593,157 | A | * | 6/1986 | Usdan ........................ 379/88.01 |
| 5,175,759 | A | * | 12/1992 | Metroka et al. ............ 455/569.1 |
| 5,912,949 | A | * | 6/1999 | Chan et al. .................. 379/88.03 |
| 6,012,030 | A | | 1/2000 | French-St. George et al. |
| 6,195,634 | B1 | | 2/2001 | Dudemaine et al. |
| 6,839,670 | B1 | * | 1/2005 | Stammler et al. ............. 704/251 |
| 6,882,973 | B1 | | 4/2005 | Pickering |
| 7,242,966 | B1 | * | 7/2007 | Averkamp .................... 455/564 |
| 2003/0055655 | A1 | | 3/2003 | Suominen |
| 2005/0064910 | A1 | * | 3/2005 | Diedrich et al. ............. 455/563 |
| 2006/0009264 | A1 | * | 1/2006 | Seo et al. ..................... 455/563 |
| 2007/0167138 | A1 | * | 7/2007 | Bauman et al. ............. 455/41.2 |
| 2008/0240377 | A1 | * | 10/2008 | Lee ........................... 379/88.03 |

FOREIGN PATENT DOCUMENTS

CN 1052015 A 6/1991

* cited by examiner

*Primary Examiner* — Olumide T Ajibade Akonai
(74) *Attorney, Agent, or Firm* — Anthony Luke Simon; Reising Ethington P.C.

(57) ABSTRACT

A dialing mode of a telematics unit in a vehicle is controlled by monitoring for dialing digits from a vehicle occupant, determining whether the type of dialing digits are continuous dialing digits or discrete dialing digits, establishing a continuous mode for receiving continuous dialing digits or a discrete mode for receiving discrete dialing digits based on the determination, and if the type of dialing digits changes, switching the established mode.

11 Claims, 3 Drawing Sheets

METHOD OF CONTROLLING DIALING MODES IN A VEHICLE

TECHNICAL FIELD

The present invention relates generally to wireless communication systems and more particularly to controlling dialing modes in a vehicle.

BACKGROUND OF THE INVENTION

Increasingly, vehicle manufacturers outfit their vehicles with a wide array of wireless communications capabilities. Telematics units installed in modern vehicles can wirelessly send both voice and data communications to a variety of recipients. Recipients can be central facilities that include servers and/or live advisors capable of responding to the telematics unit. Recipients can also include external callers.

SUMMARY OF THE INVENTION

According to an aspect of the invention, there is provided a method of controlling a dialing mode of a telematics unit in a vehicle. The steps include receiving dialing digits that are spoken by a vehicle occupant, determining that the dialing digits are no longer being spoken, adding one or more dialing digits received via a tactile device to the dialing digits spoken by the vehicle occupant, and monitoring for additional dialing digits either spoken by the vehicle occupant or received at the tactile device.

According to another aspect of the invention, there is provided a method of controlling a dialing mode of a telematics unit in a vehicle. The steps include monitoring for dialing digits from a vehicle occupant, determining whether the type of dialing digits are continuous dialing digits or discrete dialing digits, establishing a continuous mode for receiving continuous dialing digits or a discrete mode for receiving discrete dialing digits based on the determination, and if the type of dialing digits changes, switching the established mode.

According to yet another aspect of the invention, there is provided a method of controlling a dialing mode of a telematics unit in a vehicle. The steps include prompting a vehicle occupant for a query response, establishing a temporal window during which the vehicle occupant can respond to the query, monitoring for both an audible query response received via a microphone and a manual query response received via a tactile keypad, detecting the manual query response using the tactile keypad, and adjusting the temporal window based on the detection of the manual query response.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT

The method described below involves receiving dialing digits from a user in more than one dialing mode. For instance, the telematics unit can be used to place telephone calls to external callers. To do so, the telematics unit can be controlled using various dialing modes, such as one mode to receive strings of digits and another for receiving individual digits. In certain telematics systems, if a call is commenced using one dialing mode, it can be awkward or problematic to then switch to another mode. Doing so can cause a number of undesirable results, such as the expiration of a timer that can result in the loss of previously-entered digits.

In the method described herein, the user can start dialing digits using one dialing mode and in the midst of dialing the digits using that dialing mode, switch to another dialing mode without first alerting the telematics unit that he or she intends to do so. In one example, the user can begin to operate a telematics unit in order to dial digits by orally speaking the digits into a microphone. This operation can establish a voice mode at the telematics unit. At some point during the dialing operation, the user can decide to begin operating the telematics unit by inputting digits into a tactile device (e.g. keypad). When the user begins inputting digits into the tactile device, the telematics unit can change the dialing mode to a manual mode without relying on the user to do so. In another example, the user can begin uttering the dialed digits as a string of numbers. In response, a continuous mode can be established. Afterwards, if the user begins to utter dialed digits one at a time, a discrete mode can be established.

Figure 1:
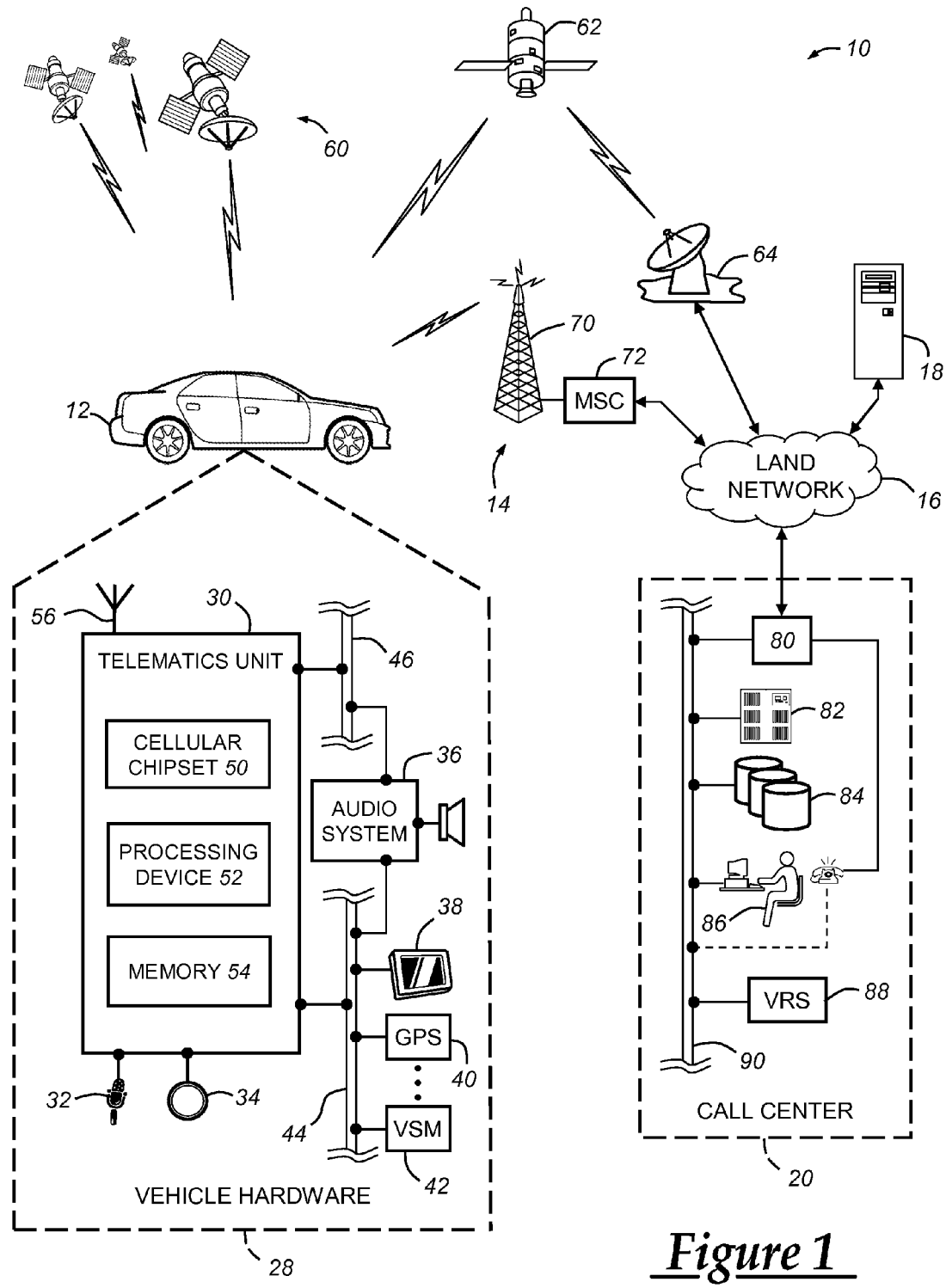
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
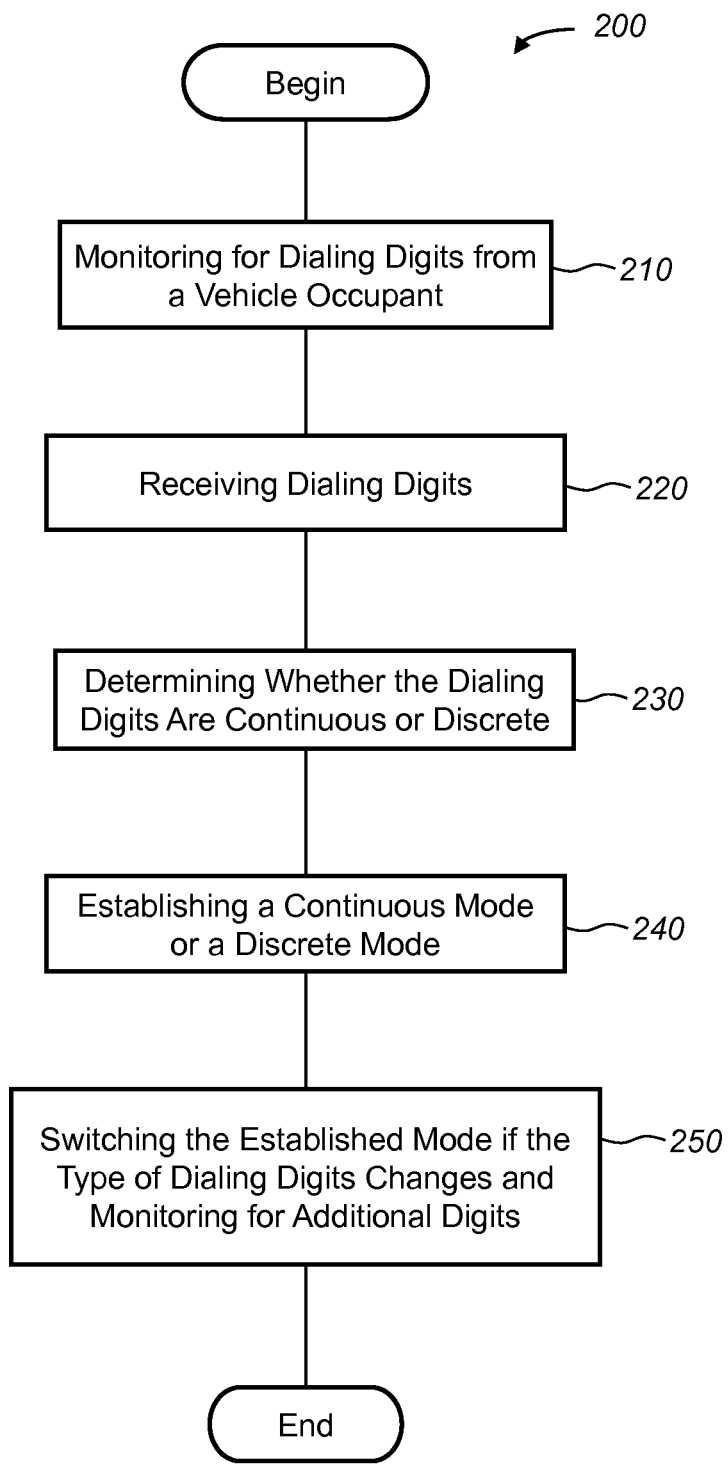
FIG. 2 is a flow chart of a method of controlling dialing modes in a vehicle.

Turning now to FIG. 2, there is a method 200 of controlling a dialing mode of a telematics unit in a vehicle. The method 200 begins at step 210 with monitoring for dialing digits from a vehicle occupant. Generally, dialing digits can be telephone numbers or other inputs commonly given to the telematics unit 30. For instance, dialing digits can also include numbers inputted in response to an interactive voice response system. It should also be appreciated that in some systems, the dialing digits can take the form of alphabet characters or responses to on-board menus stored on the vehicle 12 or sent from the call center 20. In one implementation, the telematics unit 30 monitors for the dialing digits. For example, if the dialing digits are spoken by a user, such as the vehicle occupant, the telematics unit 30 can monitor for the dialing digits through the microphone 32. In another example, the telematics unit 30 can monitor for the dialing digits inputted via a tactile device, such as a keypad or keyboard. The method 200 proceeds to step 220.

At step 220, dialing digits that are spoken by a vehicle occupant or are manually entered via a tactile device are received. As noted above, the telematics unit 30 can receive input from the user in a variety of ways. And for each way the telematics unit 30 receives input, a particular mode can be established. For instance, if the user is prompted to input dialing digits, such as a telephone number, he or she can do so by speaking the dialing digits or by manipulating the tactile device to select the appropriate dialing digits. Now, when the user chooses the manner in which to input the dialing digits, a mode representing that choice can be established. In one example, if the user chose to input the dialing digits audibly via the microphone 32, then the telematics unit 30 could then establish a voice mode. The voice mode can indicate to the vehicle 12 that it should presently expect to receive spoken input from the vehicle occupant. In contrast, if the user chose to input the dialing digits by manipulating the tactile device, such as button(s) 34, then the vehicle 12 can establish a manual mode, which indicates that the vehicle 12 is prepared to receive the dialing digits through the tactile device. Regardless of whether the voice mode or the manual mode is established, the telematics unit 30 can monitor for input that can be received using another mode. For example, after the user has uttered the telephone number, the telematics unit 30 can detect that the user has inputted a digit using the tactile device, such as pressing a button on a keypad. At that time, the telematics unit 30 can decide to change from the voice mode to the manual mode. Similarly, if the user has been inputting digits into tactile device and then decides to utter digits, the telematics unit 30 can then switch from manual mode to voice mode. The method 200 proceeds to step 230.

At step 230, it is determined whether the type of dialing digits are continuous dialing digits or discrete dialing digits. The dialing digits received from the user, in either voice mode or manual mode, can be identified as continuous digits or discrete digits. The discrete dialing digits can involve receiving the dialing digits, audibly or through the tactile device, one number at a time. In one exemplary discrete dialing mode, each digit received is speech recognized prior to receiving the next digit, and optionally this successful (or the unsuccessful) recognition can be confirmed to the user prior to receipt of the next digit. For example, the telematics unit 30 can prompt the user for one or more dialing digits and in response the user can utter a number. After receiving the uttered number from the user, the telematics unit 30 can determine that the number is a discrete dialing digit and repeat the number back to the user via the audio system of the vehicle 12. So, if the telematics unit 30 requested that the user enter dialing digits, such as responses to an interactive voice response system, each number the user said would be repeated back to the user. For example, if the user has been given a menu of options, each of which corresponds to a number, the user may want to select option number "five." In that case, the user can say "five" and the telematics unit 30 would repeat back the number "five" to the user. After the telematics unit 30 repeats the number "five," the user can then utter the next number, which the telematics unit 30 repeats, continuing this process until no more responses from the user are received. Similarly, the user could respond to the request to enter dialing digits by using the tactile device, such as a keypad. In that case, using the above example, the user could press the number "five" on a keypad and the telematics unit 30 could then repeat the number back to the user through the vehicle audio system 36. Discrete dialing digits can be received in such a way that helps verify that the telematics unit 30 correctly interprets the dialing digits spoken by the user because after the telematics unit 30 repeats the number, the user has an opportunity to correct that number if it is not interpreted correctly.

In contrast, continuous dialing digits can be a string or a plurality of numbers that are processed as such by the onboard speech recognition. In this case, the continuous dialing digits can involve receiving one or more digits, such as a telephone number. But instead of recognizing the received digital digits one number at a time, the telematics unit 30 can wait until all of the numbers in the dialing digits are spoken by the user. Given a telephone number, such as "567-1212", the user can utter "five, six, seven, one, two, one, two" before the telematics unit 30 will repeat the user's utterance. The method 200 proceeds to step 240.

At step 240, a continuous mode for receiving continuous dialing digits or a discrete mode for receiving discrete dialing digits is established based on the determination. In addition to establishing a manual mode or a voice mode, the vehicle 12 can also establish a continuous dialing mode or a discrete dialing mode. When the telematics unit 30 receives the dialing digits from the user, it can then make a determination about whether the dialing digits received from the user should be received in the discrete mode or the continuous mode. One way this can be accomplished is by using temporal windows that follow the input received from the user. The temporal window can be a period of time, the duration of which can vary, and be set either at the point of vehicle manufacture or via machine instructions wirelessly sent to the vehicle. In one example, the temporal window can be two seconds long. For instance, if the telematics unit 30 receives dialing digits from the user, it can start a temporal window after the first number is received from the user. If the user utters an additional number before the temporal window expires, then the telematics unit 30 can determine that the user is uttering a string of numbers and that the continuous mode should be selected. On the other hand, if the temporal window expires after the telematics unit 30 received the first number, the telematics unit 30 can determine that the user intends to input the dialing digits one number at a time and the discrete mode can be established. The method 200 proceeds to step 250.

At step 250, the established mode is switched if the type of dialing digits determined in step 240 changes and the method 200 monitors for additional dialing digits either spoken by the vehicle occupant or received at the tactile device. In some situations, the telematics unit 30 can begin receiving dialing digits in one mode but while the user is inputting the dialing digits it becomes beneficial to then receive the dialing digits in another mode. In one example, the user could input the telephone number as described above and the telematics unit 30 can establish the continuous mode. However, once the user has dialed the telephone number and connected with an external caller, there may be an interactive voice response system asking the user for one or more responses. The telematics unit 30 can then reevaluate the input it receives from the user and establish the discrete mode. This can happen in a variety of ways.

In one example, the telematics unit 30 can change the established mode by using the temporal window to determine that the user, after uttering the telephone number, is now uttering single digits. Once the user has uttered the telephone number, the telematics unit 30 can monitor for additional input from the user. When the user utters a single digit, the telematics unit 30 can then start the temporal window and if the window expires before additional input is received, then the telematics unit 30 can change the established mode from the continuous mode to the discrete mode. This process can also be reversed, switching from discrete mode to continuous mode. If the telematics unit 30 has been receiving dialing digits in the discrete mode, it may then begin to detect a string of dialing digits uttered within the temporal window. At that time, the telematics unit 30 can switch the established mode from the discrete mode to the continuous mode. While the established mode discussed above refers to the continuous mode or the discrete mode, it should also be appreciated the telematics unit 30 also has the capability to switch between the voice mode or manual mode described above as well. The method 200 then ends.

Figure 3:
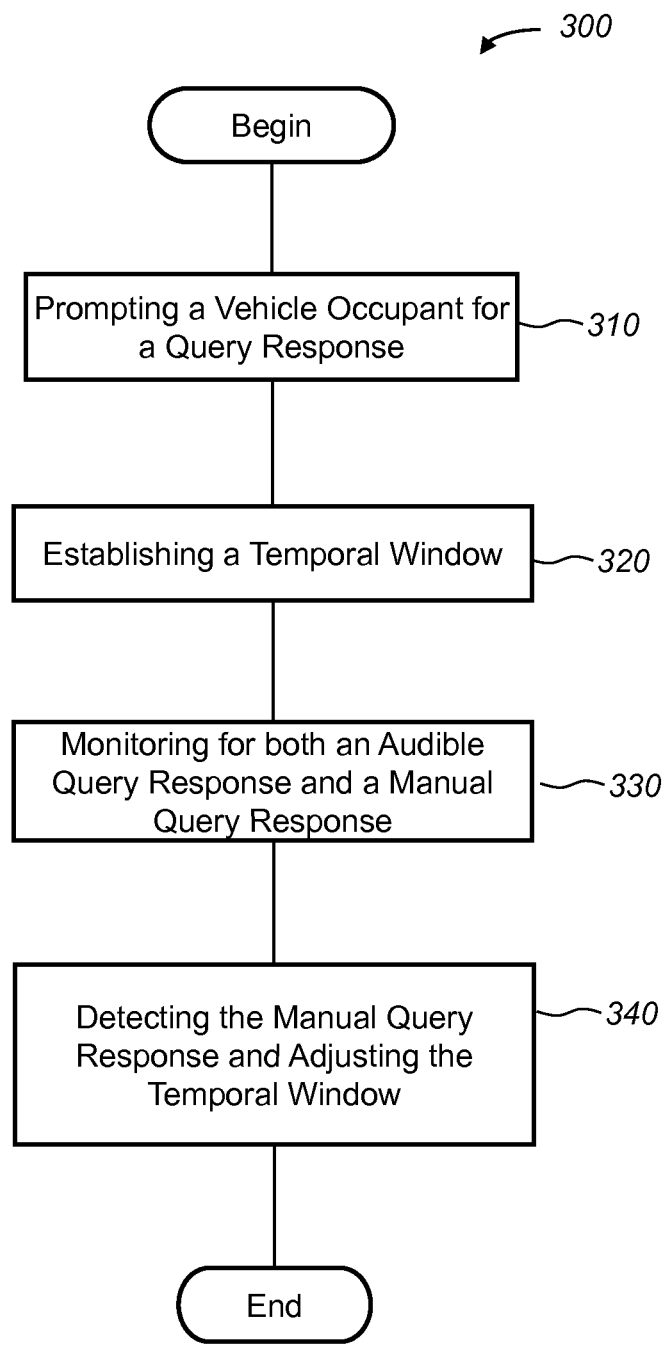
FIG. 3 is another flow chart of a method of controlling dialing modes in a vehicle.

Turning to FIG. 3, there is a method 300 of controlling a dialing mode of a telematics unit in a vehicle. The method 300 begins at step 310 by prompting a vehicle occupant for a query response. The telematics unit 30 can ask the user a question and the user can respond by uttering an answer. Alternatively, the user can manipulate the tactile device to respond to the query, such as by navigating through a variety of menu selections shown on a display 38 in the vehicle 12. In this case, the tactile device can be a keypad used to enter numbers. Or the tactile device can be a rotary knob that can be both rotated and depressed. The rotation of the knob can move a cursor over various selections on the display 38 and when the cursor arrives at his or her chosen selection, the user can depress the knob thereby selecting the menu choice. The method 300 proceeds to step 320.

At step 320, a temporal window is established during which the vehicle occupant can respond to the query. After the telematics unit 30 poses the query, the user may have a temporal window, such as a limited amount of time before the telematics unit 30 decides that the user is unresponsive. The duration of the temporal window can be fixed by the vehicle manufacturer or can be established via a machine instruction wirelessly sent to the vehicle 12. In one example, the temporal window can be five seconds long and it can begin immediately after the telematics unit 30 poses the query to the user. The method 300 proceeds to step 330.

Step 330 involves monitoring for both an audible query response received via a microphone and a manual query response received via a tactile device. The telematics unit 30 can listen for an audible response and monitor for input at the tactile device. If the user utters a response to the query, the telematics unit 30 can detect it via the microphone 32 and interpret the response using a speech recognition engine. The method 300 proceeds to step 340.

At step 340, the manual query response is detected using the tactile device and the temporal window is adjusted based on the detection of the manual query response. Instead of responding to the query audibly, the user can choose to respond via input at the tactile device. In that case, the user may benefit from a lengthened temporal window. For instance, if the tactile device takes the form of the rotary knob described above, the user may have to navigate through a number of menus—each time making a selection before ultimately providing a response to the query. Considering that the navigation of these menus may take more time than the uttered response, the telematics unit 30 can recognize that the user may need additional time to adequately respond. As a result, when the telematics unit 30 determines that the user is inputting a response using the tactile device, the unit 30 can then lengthen the established temporal window. The telematics unit can do so by adding an amount of time to the end of the temporal window, which would have the effect of extending the overall duration of the temporal window. This amount of time is variable. But in one example, the amount of time to extend the temporal window can be a variable stored at the telematics unit 30. The method 300 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling a dialing mode of a telematics unit in a vehicle, comprising the steps of:
   (a) receiving dialing digits that are spoken by a vehicle occupant;
   (b) placing a vehicle telematics unit in a voice mode;
   (c) determining that the dialing digits are no longer being spoken;
   (d) placing the vehicle telematics unit in a manual mode in response to the determination in step (c);
   (e) adding one or more dialing digits received via a tactile device to the dialing digits spoken by the vehicle occupant; and
   (f) monitoring both the tactile device and a microphone for additional dialing digits either spoken by the vehicle occupant or received at the tactile device.

2. The method of claim 1, further comprising the step of establishing a voice mode based on the spoken dialing digits.

3. The method of claim 1, wherein step (c) further comprises making the determination based on the detection of a manual manipulation of the tactile device.

4. The method of claim 1, further comprising the step of determining whether the dialing digits are continuous dialing digits or discrete dialing digits.

5. The method of claim 4, further comprising the step of establishing a continuous mode or a discrete mode based on the determination.

6. The method of claim 1, wherein the dialing digits added in step (e) are in response to an interactive voice response system.

7. The method of claim 1, wherein the tactile device is a keypad.

8. A method of controlling a dialing mode of a telematics unit in a vehicle, comprising the steps of:
   (a) monitoring for dialing digits from a vehicle occupant;

(b) determining whether the type of dialing digits are continuous dialing digits or discrete dialing digits;

(c) selecting between a continuous mode for receiving continuous dialing digits and a discrete mode for receiving discrete dialing digits based on the determination, wherein the discrete mode performs speech recognition on each digit prior to receiving subsequent digits;

(d) directing a vehicle telematics unit to enter the selected mode; and (e) if the type of dialing digits determined in step (b) changes, switching the selected mode.

9. The method of claim 8, further comprising the step of monitoring for the dialing digits via a microphone or a tactile device.

10. The method of claim 8, wherein the continuous dialing digits are a string of numbers or a telephone number.

11. The method of claim 8, further comprising the step of establishing a voice mode or a manual mode.

\* \* \* \* \*